(12) United States Patent
Rui et al.

(10) Patent No.: US 11,151,557 B2
(45) Date of Patent: Oct. 19, 2021

(54) APPARATUS AND METHOD FOR PROCESSING ELECTRONIC MESSAGES

(71) Applicant: MASTERCARD INTERNATIONAL INCORPORATED, Purchase, NY (US)

(72) Inventors: Fonseca Tomas Pereira Carvalho Rui, Madrid (ES); Bertrand Saby, Madrid (ES); Ramon Freire, Madrid (ES); Carlos Aguado, Madrid (ES)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 186 days.

(21) Appl. No.: 16/360,163

(22) Filed: Mar. 21, 2019

(65) Prior Publication Data
US 2019/0311356 A1 Oct. 10, 2019

(30) Foreign Application Priority Data
Apr. 6, 2018 (EP) .................... 18382238

(51) Int. Cl.
*G06Q 20/38* (2012.01)
*G06Q 20/18* (2012.01)
(Continued)

(52) U.S. Cl.
CPC .......... *G06Q 20/388* (2013.01); *G06Q 20/16* (2013.01); *G06Q 20/18* (2013.01); *G06Q 20/227* (2013.01);
(Continued)

(58) Field of Classification Search
CPC ...... G06Q 20/388; G06Q 20/16; G06Q 20/18; G06Q 20/227; G06Q 20/30
See application file for complete search history.

(56) References Cited

U.S. PATENT DOCUMENTS

| 9,665,858 B1 | 5/2017 | Kumar | |
|---|---|---|---|
| 2004/0167820 A1* | 8/2004 | Melick | G06Q 20/32 705/16 |

(Continued)

FOREIGN PATENT DOCUMENTS

| KR | 101814711 B1 | 1/2018 | |
|---|---|---|---|
| WO | WO-2011146932 A1 * | 11/2011 | .......... G06Q 20/227 |

OTHER PUBLICATIONS

Stratford, "Extended European Search Report," European Patent Office, Application No. 18382238.6, dated Aug. 8, 2018, 15 pages.

*Primary Examiner* — Steven S Kim
*Assistant Examiner* — Terry Nathan Murray

(57) ABSTRACT

A method for processing a plurality of electronic messages comprises, at a messaging hub comprising at least one processor and a memory device in communication with the at least one processor: receiving data relating to at least one rule to be satisfied by combining at least part of the content of respective messages; receiving one or more intent messages followed by one verification message; and, upon receiving a message: updating, in the memory device, intent message data or verification message data depending on the message content; determining from the intent message data and/or the verification message data if the at least one rule has been satisfied; providing a first indication when the at least one rule has been satisfied by the verification message data alone; and providing a second, different, indication when the at least one rule has been satisfied otherwise.

20 Claims, 6 Drawing Sheets

(51) Int. Cl.

| | |
|---|---|
| *G06Q 20/22* | (2012.01) |
| *G06Q 20/32* | (2012.01) |
| *G06Q 20/40* | (2012.01) |
| *G06Q 30/06* | (2012.01) |
| *G06Q 20/16* | (2012.01) |
| *G06Q 20/30* | (2012.01) |

(52) U.S. Cl.
CPC ......... *G06Q 20/30* (2013.01); *G06Q 20/3255* (2013.01); *G06Q 20/3278* (2013.01); *G06Q 20/401* (2013.01); *G06Q 20/405* (2013.01); *G06Q 30/0619* (2013.01)

(56) References Cited

U.S. PATENT DOCUMENTS

| | | | |
|---|---|---|---|
| 2005/0027637 A1* | 2/2005 | Kohler | G06Q 10/02 705/37 |
| 2011/0145049 A1 | 6/2011 | Hertel et al. | |
| 2011/0313871 A1 | 12/2011 | Greenwood | |
| 2012/0166332 A1 | 6/2012 | Naaman | |
| 2013/0166402 A1* | 6/2013 | Parento | G06Q 20/227 705/21 |
| 2015/0032629 A1* | 1/2015 | White | G06Q 20/26 705/44 |
| 2015/0073988 A1* | 3/2015 | Hosny | G06Q 20/12 705/44 |
| 2016/0048822 A1* | 2/2016 | Forrest | G06Q 20/12 705/26.81 |
| 2016/0267447 A1* | 9/2016 | Davis | G06Q 20/384 |
| 2018/0089959 A1 | 3/2018 | Na | |

\* cited by examiner

APPARATUS AND METHOD FOR PROCESSING ELECTRONIC MESSAGES

CROSS REFERENCE TO RELATED APPLICATION

This application claims priority to European Patent Application No. 18382238.6, filed Apr. 6, 2018, entitled "Apparatus and Method for Processing Electronic Messages", the entirety of which is incorporated herein by reference.

BACKGROUND

The present disclosure relates to methods and apparatus for processing electronic messages. More specifically, there are disclosed methods of processing messages to determine if a criterion has been satisfied by combining information contained in the messages, and providing an indication when the criterion is satisfied.

In situations where several parties must work together to achieve a collective final result, it can be challenging to achieve consensus between the parties. An example of such a situation occurs when multiple people are involved in paying for a single transaction, and the combined total of the individuals' payments must cover the full value of the transaction.

In these situations it can be difficult to ensure that each party makes a suitable contribution to achieving the final result, and a lack of communication and coordination between parties can lead to confusion as to whether the result is satisfied by the intended contributions of each party, and whether it has been satisfied following the actual contributions of each party. This can delay the process of achieving the final result, and may lead to parties making incorrect contributions or require an additional party to oversee the process to ensure that the final result is achieved.

There is a need for a method of clearly determining whether the contributions of parties involved combine to achieve the intended collective final result, and of validating the contribution of each user.

SUMMARY

In a first aspect of the present disclosure, there is provided a method for processing a plurality of electronic messages, each message associated with one of a plurality of users, the method comprising, at a messaging hub comprising at least one processor and a memory device in communication with the at least one processor:
  a. receiving data relating to at least one rule to be satisfied by combining at least part of the content of respective messages;
  b. receiving, from a plurality of terminals, associated with respective users, one or more intent messages followed by one verification message, wherein the at least one processor is configured to determine whether a message is an intent message or a verification message based on its content; and, upon receiving a message:
    i. updating, in the memory device, either intent message data or verification message data depending on the message content, the intent message data containing at least a portion of the most recent intent message from each user and the verification message data containing at least a portion of the most recent verification message from each user;
    ii. determining from content of the messages in the intent message data and/or the verification message data if the at least one rule has been satisfied;
    iii. providing a first indication when the at least one rule has been satisfied by the verification data alone; and
    iv. providing a second, different, indication when the at least one rule has been satisfied otherwise.

The data relating to the at least one rule may be received via user input.

In some embodiments, data relating to the at least one rule is received via wireless communication.

In some embodiments, one of the at least one rules is an expected total amount of a payment transaction, the intent message data contains an intended contribution of the respective associated user, and the verification message data contains an actual contribution of the respective associated user.

The at least one processor may be configured to transmit, to a payment network for each intent message, a payment authorisation request based on the intended contribution in the respective intent message. Respective verification messages may be, or comprise, approval messages for respective payment authorisation requests.

In certain embodiments, one of the at least one rules relates to a list of items. The method may further comprise the list of items being communicated to the terminals by the hub.

Some embodiments may comprise the hub being provided with the number of users and communicating a default contribution to each terminal.

In another aspect of the present disclosure, there is provided an electronic message processing apparatus comprising a hub, the hub comprising at least one processor and a memory device in communication with the at least one processor; a. wherein the memory has stored thereon instructions which, when executed by the at least one processor, cause the at least one processor to perform a method as described in the preceding paragraphs.

The message processing apparatus may comprise at least one payment device acceptance interface.

In some embodiments, the message processing apparatus may comprise at least one user terminal in communication with the hub.

The, or each, user terminal may extend from a housing of the hub.

The, or each, user terminal may comprise or be in communication with a payment acceptance interface.

The hub may feature a user interface to display information to the users. This information may comprise one or more of progress towards satisfying the at least one rule, details of the contributions from each users or details of the at least one rule. This allows users to monitor the overall progress of the process and determine if they need to adjust their contributions.

The hub and the terminals may communicate via a wired connection or a wireless connection. The terminals may be permanently connected to the hub or integrated with the hub such that the hub and all terminals share a processor, they may be modular devices that can be attached or removed, or they may be separate devices. The number of terminals may be fixed, e.g. at four terminals per hub, or it may be adjustable to any required number of terminals.

The hub may send messages to the terminals. These messages may include information of a default contribution from each user. These messages may include details of the intended contributions of other users.

The indications provided by the hub may comprise visual, audio or haptic feedback, or they may comprise messages communicated to the terminals or a server device. The terminals or server device may in turn provide visual, audio or haptic feedback.

The terminals may feature an input device. The user may provide information about their contribution to the terminal using this input device.

The user may provide information to the terminal using another device, e.g. a smartphone, wireless connection, e.g. Wi-Fi, Bluetooth or NFC, with the terminal as an input device. This allows user specific information be accessed easily.

The terminals may feature a user interface to display information to the users. This information may comprise one or more of that user's intended or verified contributions or the overall progress towards satisfying the criterion. This allows users to easily adjust their contribution.

The terminals may be devices provided by the user, e.g. a smartphone, and capable of communicating directly with the hub through a wireless technology such as Wi-Fi, Bluetooth or NFC, or indirectly over the Internet. This allows user specific information be accessed easily.

The payment acceptance interface, or interfaces, may be configured to receive data from payment devices such as debit/credit cards, smartphones or smart watches executing digital wallet applications such as Apple Pay or Android Pay, or other payment-enabled electronic devices such as fobs, jewellry and the like having a contactless payment interface embedded therein.

There may be one terminal per user, or the number of users may be greater than the number of terminals such that some users have to share a terminal. This allows the device to work with any number of users.

The user may be requested to provide validation information before sending a verification message. Validation information may comprise one or a combination of entering a code on terminal/device in communication with terminal, presenting credit/debit card information or presenting biometric information such as a fingerprint or iris scan.

The terminals may be in wireless communication with a server. This server may be used to validate the user's contribution before sending the verification message to the hub. The verification message may then comprise an approval message from the server.

The verification message may contain validation information that the hub can use to validate the user's contribution.

The verification message may contain information including information that is to be forwarded from the hub to a server in order to validate a user's contribution. These messages may be queued and sent as a batch, or may be sent separately.

BRIEF DESCRIPTION OF THE DRAWINGS

Embodiments will now be described in detail, by way of example only, with reference to the accompanying figures, in which.

DETAILED DESCRIPTION

Figure 1:
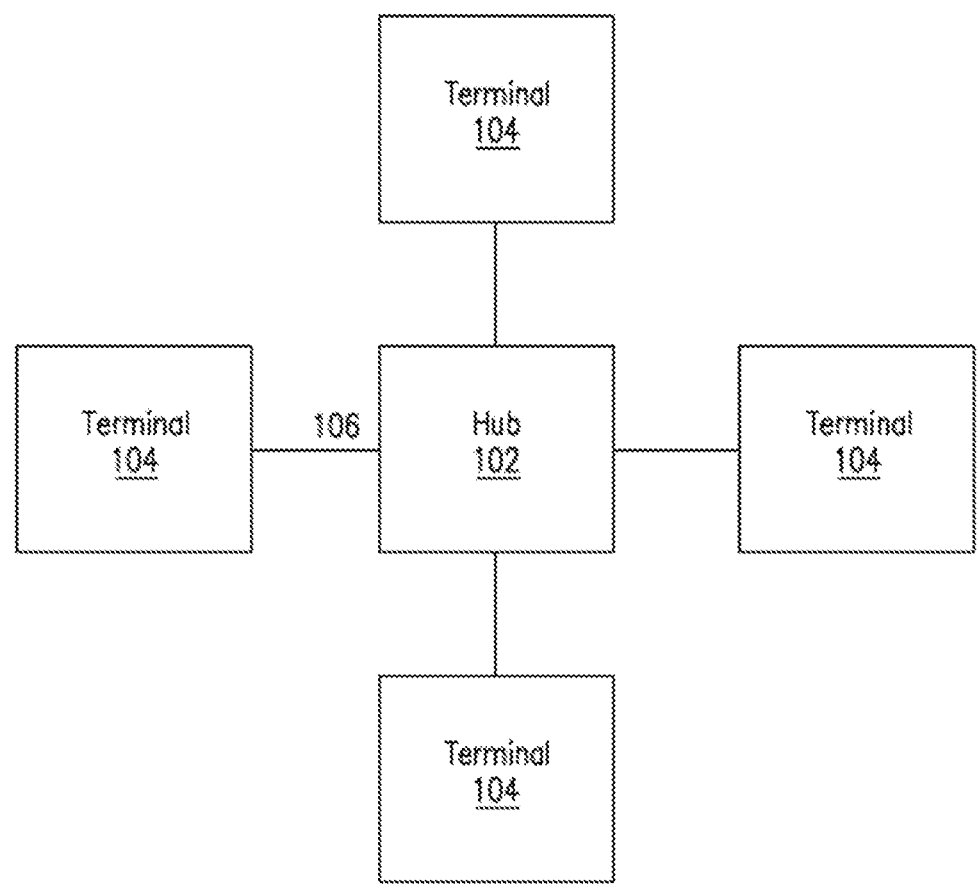
FIG. 1 shows an example system for processing messages.

FIG. 1 shows an example of a message processing apparatus 100 for processing messages to determine if a criterion has been satisfied by information contained in the messages. The apparatus 100 comprises a hub 102 in communication with one or more terminals 104 via a communications link 106, which are operated by one or more users.

In certain embodiments, the hub 102 is configured to process messages received from terminals 104 by a method which is initiated by providing the hub 102 with at least one rule to be satisfied by the messages. In one example, the messages relate to payment transactions and one of the at least one rules is an expected total amount of the payment transactions, typically the total of a bill which is to be split among the users of terminals 104. Each user may interact with one of the terminals 104 to provide information about their contribution towards satisfying the at least one rule, and this information is then encoded into a message by the terminal 104 and communicated from the terminal 104 to the hub 102. Several messages may be communicated by each user, including one or more intent messages and one verification message, with the verification message communicated after all intent messages from that user have been communicated. The number of intent messages communicated by each user can be different.

The intent messages are used to signal the contribution that the user is intending to make towards satisfying the rule, i.e. the intended contribution, and the user may send additional intent messages to update their intended contribution in response to the contributions of other users or other factors. Once the user has decided on a definite amount to contribute, they interact with the terminal 104 to validate their contribution and communicate a verification message to the hub 102, which the hub 102 then uses to determine the user's verified contribution.

When the hub 102 receives a message, it stores information from the message that is related to satisfying the rule, and the hub 102 then checks if the rule has been satisfied by a combination of the most recent messages received from each user. For example, each message may be pushed into a respective queue depending on whether it is an intent message or a verification message, with only the user's most recent intent message or verification message being present in an intent message queue or verification message queue respectively. In another example, the memory of the hub 102 may store intent message data containing at least a portion of the most recent intent message from respective users, and verification message data containing at least a portion of the verification messages of respective users. If the rule has been satisfied by a combination of messages including one or more intent messages, the hub 102 will provide an indication that this this is the case. If the criterion has been satisfied by a combination of verification messages alone, the hub 102 will provide a different indication to signal that this is the case; at this point the process is complete.

The hub 102 continues to receive messages until the rule has been satisfied by verification messages. The hub 102 can check if the rule has been satisfied after it receives each message, after a pre-determined number of messages have been received, or at pre-determined time intervals.

Figure 2:
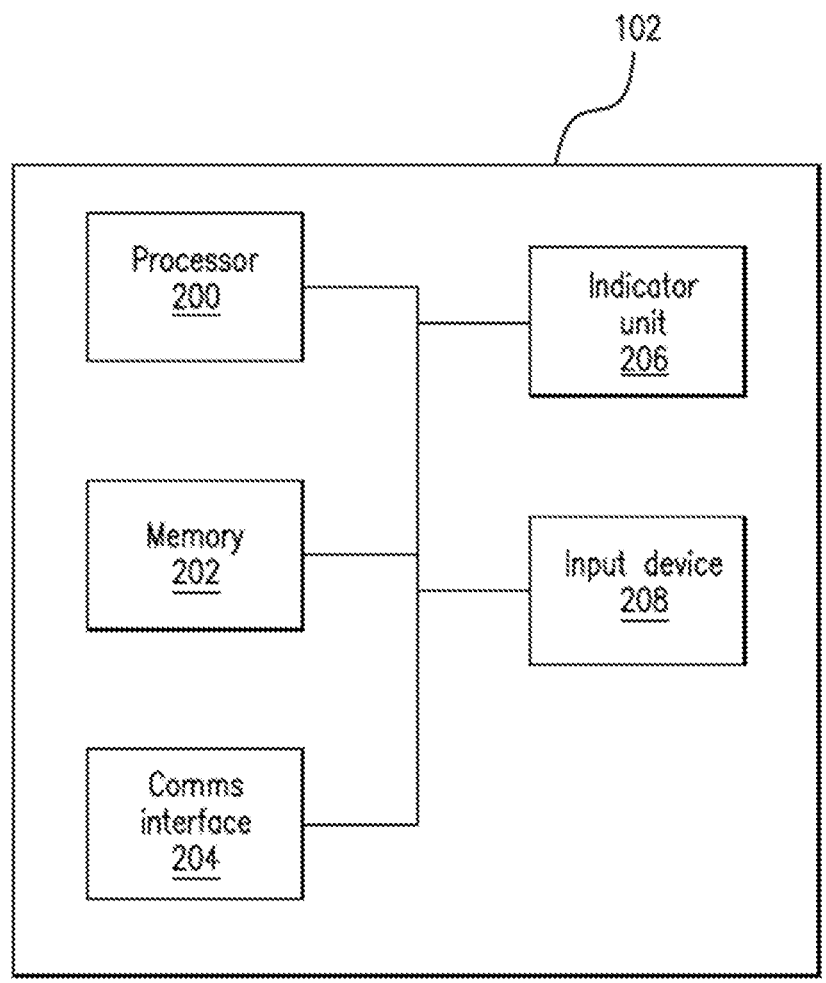
FIG. 2 shows an exemplary hub.

FIG. 2 illustrates an example schematic configuration of the hub 102. The hub 102 comprises a processor 200, memory 202 and a communications interface 204. The hub 102 is in communication with one or more terminals 104 via the communications interface 204; this may be a wired or wireless communication. The hub 102 may further comprise one or more indicator units 206 such as a light, a speaker and/or a haptic feedback unit.

Details of the rule to be satisfied are provided to the hub 102, either using an input device 208 on the hub, or through a wireless or wired connection via the communications interface 204, and are stored in the hub's memory 202 for the duration of the procedure.

Once the rule has been provided, the hub 102 begins receiving messages from the terminals 104 through the communications interface 204. When a message is received, information from the message is stored in the hub's memory 202, and the processor 200 is used to determine if the rule has been satisfied and whether it has been satisfied by a combination of verification messages in the verification message queue or by intent messages in the intent message queue.

When the rule is satisfied, the hub 102 provides an indication using the indicator unit 206, or by communicating a message to one or more of the terminals or a server device via the communications interface 204.

The hub 102 will provide one indication when it determines that the rule has been satisfied by a combination of verification messages, and a different indication when it determines that the rule has been satisfied by a combination of intent messages. In some embodiments the hub 102 may provide a third indication when it determines that a combination of messages from the verification message and intent message queues satisfy the rule. The hub 102 may optionally provide a further indication using the indicator unit 206 when the rule has not been satisfied.

Figure 3:
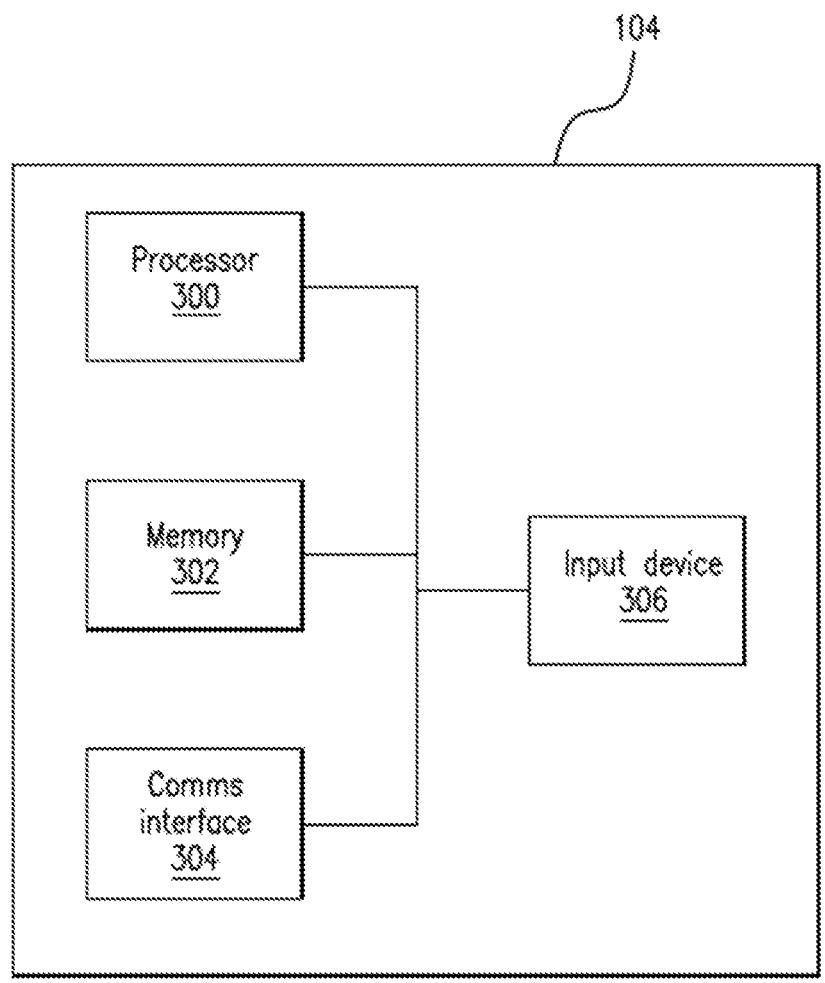
FIG. 3 shows an exemplary terminal.

FIG. 3 illustrates an example of a terminal 104 in schematic form. The terminal 104 comprises a processor 300, memory 302 and a communications interface 304. Each terminal 104 is in wireless or wired communication with the hub 102 via the communications interface 304. The terminals 104 may additionally feature an input device 306 that the user can interact with to provide information about their intended and verified contributions.

Once the user has provided information about their intended contribution, the terminal 104 encodes the information into an intent message and communicates it to the hub 102 using the communications interface 306. The user can communicate further intent messages if necessary, or interact with the terminal 104 to validate their contribution and cause a verification message to be communicated to the hub 102. The user does not provide any further information once the verification message has been communicated to the hub 102.

If the number of users is greater than the number of terminals 104, then one or more of the terminals 104 is shared between multiple users. In this case, one user will communicate all of their intent and verification messages before the next user starts communicating their intent messages using the terminal 104.

Validating a user's contribution may involve the terminal 104 communicating directly or indirectly with an external server to verify the user's contribution, and may require the user interact with the terminal 104 to provide a password, a PIN/code, biometric validation or present an NFC device or a credit or debit card or similar.

For example, where the rule to be satisfied is that the sum of the users' contributions meets or exceeds a total required payment amount, the terminal 104 and/or the hub 102 may prompt the user to tap, dip or swipe a payment device at a payment device acceptance interface of the hub 102 or the terminal 104, optionally also requiring a cardholder verification method such as PIN or biometric verification. This causes a payment authorisation request to be initiated by the hub 102 or the terminal 104. A payment authorisation request message, for example in ISO 8583 format, is transmitted to the issuer of the payment credentials stored on the payment device, via a payment network in known fashion, and an authorisation response (approve or decline) is transmitted back to the terminal 104 or the hub 102. In the case of the authorisation response message being transmitted to the terminal 104, the terminal 104 may then transmit the authorisation response message to the hub 102. In any event, the hub 102 may then treat an authorisation response of "approve" as a verification message which is pushed to the verification message queue.

Figure 4A:
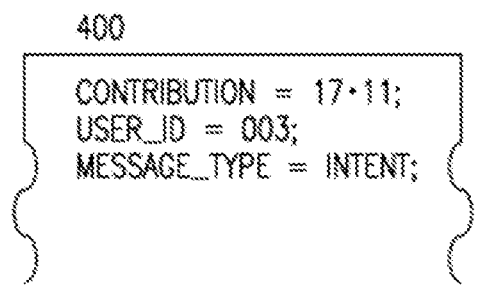
FIG. 4A shows an example structure of a message.

FIG. 4A shows an example structure of a message 400. The message includes details of the user's contribution 402 to achieving the collective result, an indicator of whether it is an intent or verification message 406, and an identifier associated with the user 404.

Figure 4B:
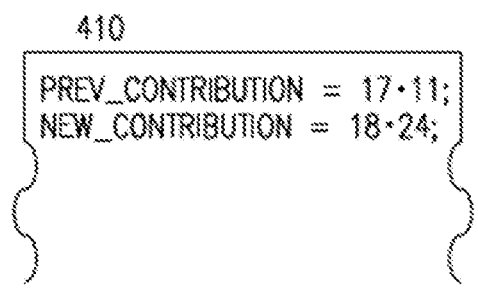
FIG. 4B shows an alternative example structure of an intent message.

FIG. 4B shows an alternative example structure of an intent message 410, which shows the user's previous intended contribution 412 and their updated intended contribution 414. In this case, the hub 102 can track and update the total intended contributions without storing each user's most recent contribution in a database.

Figure 4C:
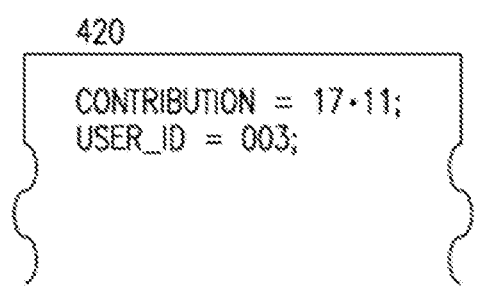
FIG. 4C shows another alternative example structure of an intent message.

FIG. 4C shows another alternative example structure of an intent message 420. The message includes details of the user's contribution 422 to achieving the collective result and an identifier 424 associated with the user. The hub 102 stores details of each user's most recent intended contribution in a database.

In this case, a verification message comprises the user ID 424 and signals that the most recent intended contribution 422 should be used as the final validated contribution.

In all of these examples, the messages may be encrypted for increased security, and additional information may be included in the message.

Figure 5:
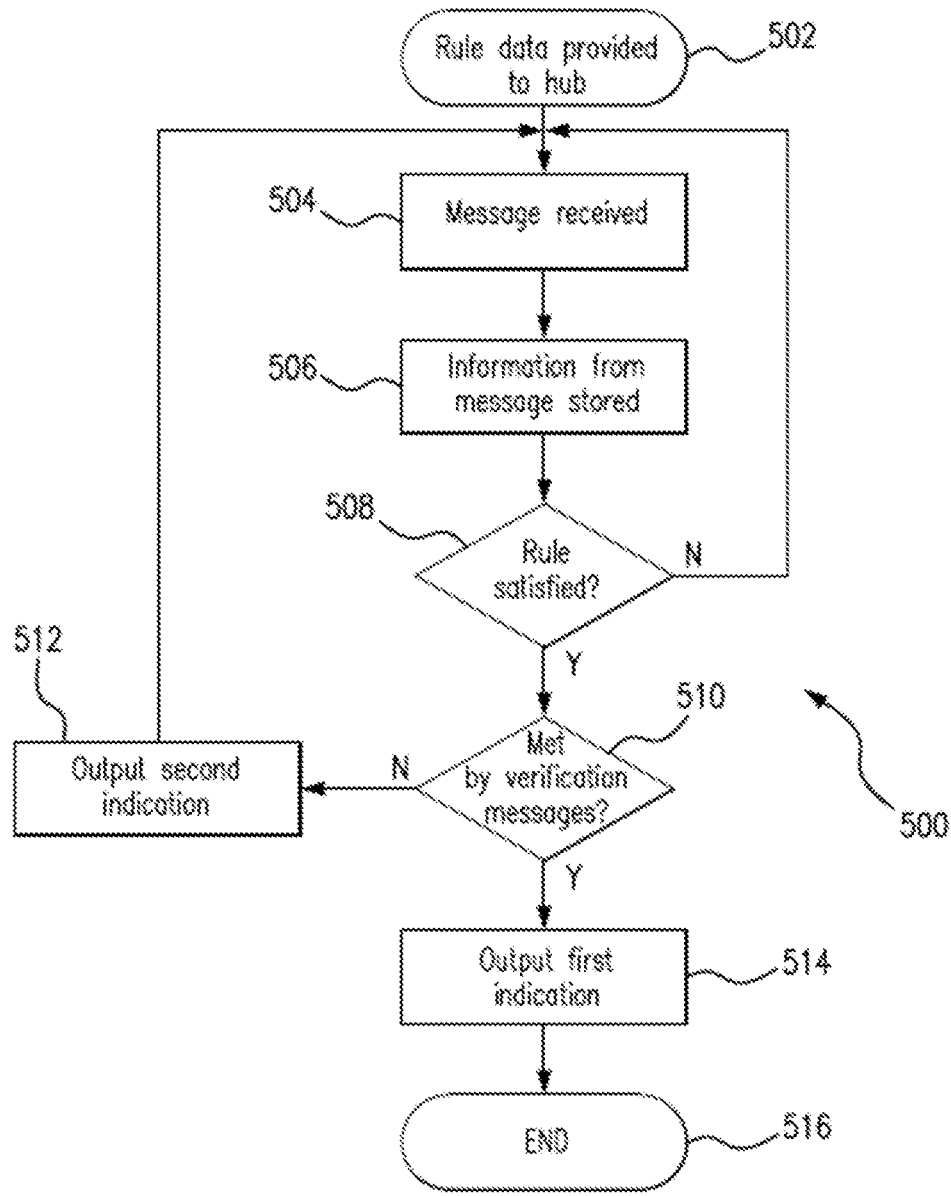
FIG. 5 is a flowchart of a method of receiving and processing messages.

FIG. 5 illustrates steps of an exemplary method 500 of processing the messages using the apparatus of FIG. 1.

In step 502, the hub 102 receives data relating to the at least one rule that is to be satisfied and stores the rule data in its memory 202. This may be input manually using an input device of the hub 208, or it may be communicated to the hub 102 through a wired or wireless connection via the communications interface 204 of the hub 102.

In step 504, the hub 102 receives a message from one of the terminals 104. The message may be received through a wired or wireless interface via the communications interface of the hub 204. The message contains information provided by one of the users, and the information may have been input to the terminal 104 using an input device 306 of the terminal 104 or a device of the user that is in wireless communication with the terminal 104.

In step 506, the hub 102 stores information from the received message in a data structure in the hub's memory 202. The data structure may be a list, a database, one or more cumulative totals or a similar data structure. Storing information may comprise modifying previously stored information.

In step 508, the hub 102 determines if the rule has been satisfied. This may be achieved by using information in the data structure. For example, if the collective final result is for the total amount contributed by all users to equal a certain value, such as the total expected payment amount for a purchase to be split between a plurality of users, then the hub 102 may compare the cumulative total to the value, or the hub 102 may sum values stored in a database and compare this total to the value to be achieved.

If the condition is not met, the hub 102 continues to receive messages, returning to step 504. The hub 102 may optionally provide an indication that the rule has not been satisfied.

If the condition is met, the step 510 is performed. If the at least one rule is satisfied by verification messages only, a first indication is given, step 514, and the hub 102 stops receiving messages. If the criterion is satisfied otherwise, the hub 102 gives a second, different, indication, step 512, and continues to receive messages, returning to step 504.

In an embodiment, the at least one rule is provided 502 to the hub 102 using an input device 208 on the hub. For example, in the case of a collective purchase, the total value to be paid is provided to the hub 102, either input by the payee using the input device 208 on the hub, or communicated to the hub 102 through a wired or wireless connection from a server device of the payee. Each user then interacts with an input device 306 on a terminal 104 to provide their intended contribution, such as an intended payment amount, which the terminal 104 encodes in an intent message which is communicated to the hub 102.

The hub 102 may store this information in a database, for example in two tables containing intent message records and verification message records respectively, or using two cumulative totals, one of intended and one of verified payments. Following receipt of the messages, the hub 102 determines if the verified payments sum to the total value to be paid, and provides a first indication 514 if they do. Otherwise, the hub 102 determines if the verified and intended payments sum to the total value to be paid and provides a second indication 512 if they do.

If necessary, each user can use the terminal 102 to adjust their intended payment and send a further intent message, or they can send a verification message to the hub 102.

In some embodiments, a user may validate their contribution by using a payment device such as a credit or debit card, or a smartphone or other similar device executing a digital wallet application such as Android Pay or Apple Pay, to make a payment using a payment acceptance interface of the terminal 104, which causes the terminal 104 to communicate a verification message to the hub 102. The terminal 104 is in communication with a payment network, either through a direct connection to a server of an acquirer processor system or by communicating via the hub 102.

The hub 102 may be provided with the number of users and then set a default initial contribution of each user by dividing the total value of the transaction equally among all users and communicating this value to each terminal 104, allowing each user to adjust their contribution upwards or downwards as necessary.

The hub 102 continues to receive messages until the total value is met by verified payments.

When the hub 102 receives 504 the intent messages it displays an indication of whether the rule is satisfied, and shows the progress towards satisfying the rule on a user interface of the hub. One or more of the users may then adjust their contribution using the input device 306 on their terminal 104, prompting a new intent message to be communicated to the hub 102. Additionally, one or more users may decide they are not going to adjust their contribution and instead validate their contribution in order to generate a verification message which is transmitted to the hub 102.

A user may validate their contribution by presenting a password, a PIN, biometric authentication, or a payment device such as a credit/debit card, or payment-enabled smartphone, smartwatch, fob, item of jewellery, etc.

Once the rule is satisfied by a combination of messages comprising at least one intent message, the hub 102 displays an indication 512 that the criterion is satisfied, but not all users have sent a verification message. At this point, any user that has not already sent a verification message uses the terminal 104 to validate their contribution and send a verification message, and the hub 102 then indicates 514 that the rule has been satisfied by verification messages alone.

In another embodiment, a detailed breakdown of items required to satisfy one or more rules is provided 502 to the hub 102 by a server (not shown) through the communications interface 204. For example, a point of sale (POS) system may communicate with the hub 102 to provide a list of items, the total value of which equals the total required payment amount. In such embodiments, the server may transmit further rule data relating to an additional rule that the consolidated list of items associated with respective users matches the list of items provided by the server.

The hub 102 then communicates the detailed breakdown to the terminals 104, or this may be communicated directly to the terminals 104 by the server, and the users provide their contribution to satisfying the at least one rule by using an input device 306 on the terminal 104 to select the items that they are responsible for. Once they have selected their items, an intent message is communicated from the terminal 104 to the hub 102.

When the hub 102 receives the intent messages it displays an indication of whether the at least one rule is satisfied, and shows the progress towards satisfying the at least one rule on a user interface; this progress display may comprise items on the list that no users have selected. One or more of the users may then adjust their contribution by changing their selection of items using an input device on their terminal 104 if necessary, prompting a new intent message to be communicated to the hub 102. Additionally, one or more users may decide they are not going to adjust their contribution and instead validate their contribution in order to communicate a verification message to the hub 102, or to initiate generation of a verification message via an external system such as a payment network, the verification message then being transmitted either directly to the hub 102 by the external system, or indirectly via the terminal 104.

A user may validate their contribution by presenting a password, a PIN, biometric authentication, or presenting a payment device such as a credit or debit card, or an NFC-based payment-enabled device, at a payment acceptance interface of the hub 102 or the terminal 104.

Once the at least one rule is satisfied by a combination of messages comprising at least one intent message, the hub 102 displays a first indication 512 that the at least one rule is satisfied, but that a verification message has not yet been received from all users. At this point, any user that has not already sent, or initiated the sending of, a verification message uses the terminal 104 (for example, in conjunction with a payment acceptance interface of the hub 102 or the terminal 104) to validate their contribution and send a verification message, and the hub 102 then indicates 514 via a second, different, indication means that the at least one rule has been satisfied by verification messages alone.

For example, if the at least one rule to be satisfied includes the payment of all items in an itemised list, the list of items is provided to the hub 102 by a server device of the payee through the communication interface 204, including a detailed breakdown of items required to satisfy the at least one rule. The hub 102 then communicates the detailed breakdown to the terminals 104, or this may be communicated directly to the terminals 104 by the server, and the users provide their contribution to satisfying the rule by using an input device 306 on the terminal 102 to select the items that they are responsible for. Once they have selected their items, the terminal 104 sends an intent message to the hub 102.

The hub 102 provides an indication of whether or not the criterion is satisfied, i.e. whether all items have been selected. One or more of the users then adjusts their contribution by changing their selection of items using an input device on their terminal 104 if necessary, and sends a new intent message, and one or more other users may decide they are not going to adjust their contribution and make their payment using a credit or debit card or similar method, such as Android Pay or Apple Pay, to make a payment using the terminal 104.

If the criterion is then satisfied, the hub 102 may display an indication 512 that the rule is satisfied but not all users have sent a verification message. At this point, any users that have not already sent a verification message use the terminals 104 to send a verification message, and the hub 102 then indicates 514 that the rule has been satisfied by verification messages alone.

In this embodiment, if multiple users select the same item, the cost of that item is split between those users.

Figure 6:
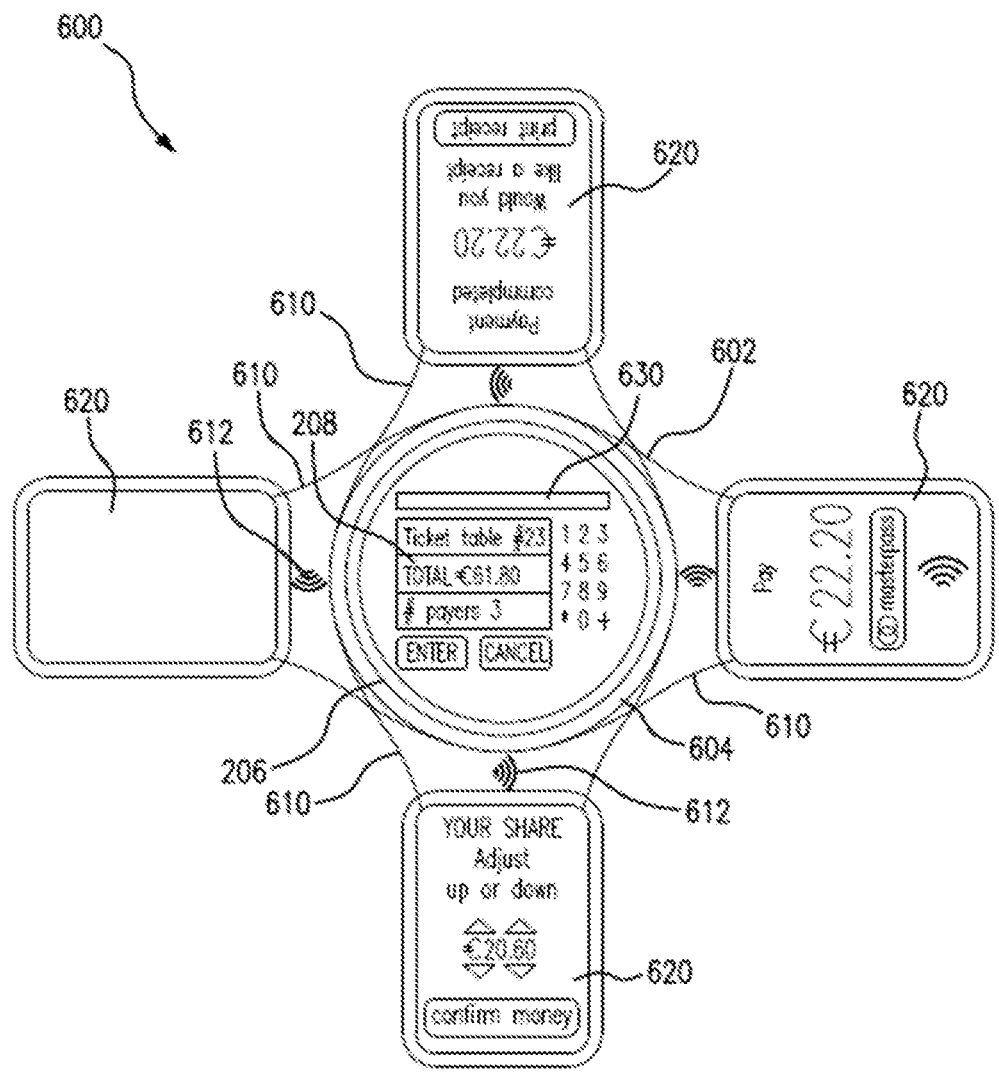
FIG. 6 shows an exemplary physical configuration of a message processing apparatus.

FIG. 6 shows an example physical configuration of a message processing apparatus according to certain embodiments. The message processing apparatus 600 comprises a hub 602 (which may have similar architecture to the hub 102 of FIG. 2) with a hub housing 604 from which a plurality of arms 610 extends. Each arm 610 carries a terminal 620 having a display, and a user input interface via which users can enter information which is used to generate an intent message or a verification message as described above. The terminal 620 may have an architecture which is generally similar to that of the terminal 104 shown in FIG. 3. Each terminal 620 is in communication with the hub 602. In some embodiments the terminals 620 are permanently affixed to respective arms 610, while in other embodiments one or more of the terminals 620 may be connected to the arms 610 (for example, via electrical contacts which allow establishment of a communications path between the terminal 620 and hub 602) and removable therefrom. The apparatus 620 may also comprise a printer 630, embedded in hub housing 604 for example, for printing receipts and the like.

In certain embodiments, each arm 610 of the hub 602 carries a contactless payment acceptance interface in the form of an NFC interface 612. The NFC interface 612 has a relatively small footprint such that multiple interfaces can be embedded in the hub 602 without increasing the bulk of the apparatus 600, and allowing multiple users to initiate payments simultaneously using a wide variety of contactless payment devices. Other payment acceptance interfaces known in the art are also possible, for example a slot or other card reader interface adapted to receive a card such that a magnetic stripe or chip of the card can be read in order to initiate a payment.

The hub 602 has an input device in the form of touch screen display 208. This enables a user to enter a total expected payment amount, and a number of payers (users) between whom the amount will be split. After the total amount has been entered, the hub 602 determines default values for the individual payers, and communicates the default values to terminals 620 accordingly. For example, if the total amount is $61.80, the hub 602 may determine a default contribution of $20.60 for each of the three users, and communicate this to three of the four available terminals 620 as shown. Individual users may then adjust their intended contribution via the touch screen interfaces of respective terminals 620.

The hub 602 has an indicator unit 206. In this example the hub housing 604 is generally circular in shape and the indicator unit 206 is an LED-illuminated ring which extends around the circumference of the hub housing 604. It will be appreciated that other configurations of indicator unit 206 and hub housing are also possible. The indicator unit 206 is configured to provide a first indication, such as a green light, when the hub 602 determines that a combination of intent message data and verification message data satisfies a rule (in this case, meet or exceed a total expected payment amount), and a second indication, such as a blue light, when the hub 602 determines that only the verification message data satisfies the rule. Other indications are also possible. For example, a red light may be displayed by indicator unit 206 when the payment process has been initiated but no intent or verification messages have yet been received. In another example, a yellow light may be displayed by the indicator unit 206 when verification messages have been received from all terminals 620, but one or more of the verification messages from terminals 620 indicates that a cash payment is required by the user of that terminal (for example, by the user selecting a cash payment option on the touch interface of terminal 620).

The hub 602 may have stored on its memory one or more software modules for generating and processing payment-related messages, such as authorisation requests and responses. For example, the memory may store a payment terminal operating system, one or more EMV kernel modules, and one or more payment application modules. The payment application module(s) may receive payment information from a contactless interface 612 (or another payment acceptance interface of the message processing apparatus 600) associated with a terminal 620, the payment information including a payment card identifier, cause the generation of an authorisation request message which is transmitted to an issuer of the payment card identifier (for example, via a payment network) in known fashion, and receive an authorisation response message indicating, amongst other possible statuses, an approval or decline of the authorisation request. The authorisation response message may comprise an EMV transaction certificate (TC), for example. The hub 602 may then communicate the result of the authorisation request to the terminal 620.

Typically, the hub 602 comprises at least one communications interface, such as a wireless communications interface, for communicating with one or more remotely located servers (not shown). For example, the at least one communications interface may be used to transmit and receive payment-related messages as discussed above. In addition, at least one communications interface (such as a Bluetooth or WiFi interface) may be used to communicate with a point of sale (POS) system, for example to receive a detailed breakdown of items as discussed above in relation to the process 500. The POS system may communicate with the hub 602 to provide a list of items ordered by persons seated at a table having a table identifier. For example, a user of apparatus 600, such as a waiter, may enter the table identifier via user interface 208, which prompts the hub 602 to contact the POS system to retrieve items associated with the table identifier, the total value of the items being the total required payment amount.

The hub 602 may then communicate the list of items to the terminals 620. Respective users may then use an interface of terminal 620 (typically a touch screen interface) to select the items that they are responsible for. Once they have selected their items, an intent message is communicated from the terminal 620 to the hub 602. In some embodiments, users may elect to pay for part of an item. In this case, terminal 620 may allow an item already selected by one user to also be selected by one or more other users, such that the total value of the item is apportioned between the terminals associated with all users who selected the item.

When the hub 602 receives the intent messages from respective terminals 620 it displays an indication of whether all items are accounted for, and whether the total of the respective amounts intended to be paid by respective terminals 620 matches or exceeds the total amount of the bill, and shows the progress towards satisfying the respective requirements via user interface 208 of hub 602; this progress display may comprise items on the list that no users have selected. One or more of the users may then adjust their contribution by changing their selection of items using an input device on their terminal 620 if necessary or desired (e.g. to select as yet unaccounted for items or to add a tip), prompting a new intent message to be communicated to the hub 602. Additionally, one or more users may decide they are not going to adjust their contribution and instead validate their contribution in order to communicate a verification message to the hub 602, or to initiate generation of a verification message via an external system such as a payment network, the verification message then being transmitted either directly to the hub 602 by the external system, or indirectly via the terminal 620.

In some embodiments, the hub 602 may be configured to process one or more of the user contributions according to information stored by or accessible by the POS system. For example, the POS system may store loyalty or coupon information in a data store, and users may enter a loyalty identifier or coupon identifier in order to accumulate loyalty points and/or receive rewards, such as a discount on the total amount of the bill or on their contribution to it. In some embodiments, the user may store loyalty or coupon information in a digital wallet application executable by a smartphone or other contactless payment enabled device, such that the loyalty identifier or coupon identifier can be transmitted to the hub 602 at the same time as making a payment, by the user bringing their contactless payment enabled device into proximity with one of the contactless payment interfaces 612.

Other embodiments will be apparent to those skilled in the art from consideration of the specification and practice of the embodiments disclosed herein. It is intended that the specification and examples be considered as exemplary only.

In addition, where this application has listed the steps of a method or procedure in a specific order, it could be possible, or even expedient in certain circumstances, to change the order in which some steps are performed, and it is intended that the particular steps of the method or procedure claims set forth herein not be construed as being order-specific unless such order specificity is expressly stated in the claim. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

The methods described herein may be encoded as executable instructions embodied in a computer readable medium, including, without limitation, non-transitory computer-readable storage, a storage device, and/or a memory device. Such instructions, when executed by a processor (or one or more generators, processors, and/or other devices) cause the processor (the one or more generators, processors, and/or other devices) to perform at least a portion of the methods described herein. A non-transitory computer-readable storage medium includes, but is not limited to, volatile memory, non-volatile memory, magnetic and optical storage devices such as disk drives, magnetic tape, CDs (compact discs), DVDs (digital versatile discs), or other media that are capable of storing code and/or data.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded generator devices, personal generators, server generators (specific or cloud (virtual) servers), hand-held or laptop devices, multiprocessor systems, microprocessor-based systems, set top boxes, programmable consumer electronics, mobile telephones, network PCs, minigenerators, mainframe generators, distributed generating environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

The invention claimed is:

1. A hub for processing electronic messages related to payments, the hub comprising:
at least one processor;
a plurality of arms with contactless payment acceptance interfaces for interacting with contactless payment devices, wherein each contactless payment acceptance interface is configured to wirelessly receive electronic messages from the contactless payment devices,
the electronic messages comprising intent messages indicating an intended contribution of a user toward a total payment and a verification message indicating a definite amount the user agrees to pay toward the total payment,
wherein the contactless payment acceptance interfaces comprise four contactless payment acceptance interfaces positioned around the hub;
four terminals affixed to the plurality of arms and comprising the four contactless payment acceptance interfaces for receiving messages from the contactless payment devices associated with respective users;
memory embodied with executable instructions that cause the at least one processor to:
receive, from the contactless payment devices associated with the respective users through the contactless payment acceptance interfaces, intent messages followed by verification messages, wherein the at least one processor is configured to determine whether a received message is an intent message or a verification message through analysing content of the received message; and, upon receiving a message:
update, in the memory, intent message data or verification message data depending on the received message, the intent message data containing at least a portion of a most recent intent message from each user and the verification message data containing at least a portion of a most recent verification message from each user;
determine from the intent message data or the verification message data if at least one rule has been satisfied;
provide a first indication when the at least one rule has been satisfied by the verification message data alone; and
provide a second indication when the at least one rule has been satisfied otherwise,
wherein the first indication differs from the second indication.

2. The hub of claim 1, wherein the four contactless payment acceptance interfaces are positioned circularly around the hub in different directions.

3. The hub of claim 1, wherein data relating to the at least one rule is received via user input.

4. The hub of claim 1, wherein data relating to the at least one rule is received via wireless communication.

5. The hub of claim 3, wherein the at least one rule is an expected total amount of a payment transaction.

6. The hub of claim 5, wherein the at least one processor is configured to transmit, to a payment network for each intent message, a payment authorisation request based on the intended contribution in the respective intent message.

7. The hub of claim 1, wherein the four terminals each comprise a display to show progress of the verification messages combining to meet a payment transaction total.

8. The hub of claim 7, wherein the displays display different indications to indicate when the intent message data or the verification message data add up to a transaction amount.

9. A hub for processing electronic messages related to payments, the hub comprising:
at least one processor;
a plurality of arms with contactless payment acceptance interfaces for interacting with contactless payment devices, wherein each contactless payment acceptance interface is configured to wirelessly receive messages from the contactless payment devices, the electronic messages comprising intent messages indicating an intended contribution of a user toward a total payment and a verification message indicating a definite amount the user agrees to pay toward the total payment, wherein the contactless payment acceptance interfaces comprise two contactless payment acceptance interfaces positioned around the hub;
two terminals affixed to the plurality of arms and comprising the two contactless payment acceptance interfaces for receiving messages from the contactless payment devices associated with respective users;
memory embodied with executable instructions that cause the at least one processor to:
receive, from the contactless payment devices associated with the respective users through the contactless payment acceptance interfaces, intent messages followed by verification messages, wherein the at least one processor is configured to determine whether a received message is an intent message or a verification message through analysing content of the received message; and, upon receiving a message:
update, in the memory, intent message data or verification message data depending on the received message content, the intent message data containing at least a portion of a most recent intent message from each user and the verification message data containing at least a portion of a most recent verification message from each user;
determine from the intent message data or the verification message data if at least one rule has been satisfied;
provide a first indication when the at least one rule has been satisfied by the verification message data alone; and
provide a second indication when the at least one rule has been satisfied otherwise,
wherein the first indication differs from the second indication.

10. The hub of claim 9, wherein the two contactless payment acceptance interfaces are positioned around a circular housing of the hub in different directions.

11. The hub of claim 9, wherein data relating to the at least one rule is received via user input.

12. The hub of claim 9, wherein data relating to the at least one rule is received via wireless communication.

13. The hub of claim 9, wherein the at least one rule is an expected total amount of a payment transaction.

14. The hub of claim 9, wherein the at least one processor is configured to transmit, to a payment network for each intent message, a payment authorisation request based on the intended contribution in the respective intent message.

15. A hub for processing electronic messages related to payments, the hub comprising:
at least one processor;
a plurality of arms with contactless payment acceptance interfaces for interacting with contactless payment devices, wherein each contactless payment acceptance interface is configured to wirelessly receive messages from the contactless payment devices, the electronic messages comprising intent messages indicating an intended contribution of a user toward a total payment and a verification message indicating a definite amount the user agrees to pay toward the total payment, wherein the contactless payment acceptance interfaces comprise three contactless payment acceptance interfaces positioned around the hub;
three terminals affixed to the plurality of arms and comprising the three contactless payment acceptance interfaces for receiving messages from the contactless payment devices associated with respective users;
memory embodied with executable instructions that cause the at least one processor to:
receive, from the contactless payment devices associated with the respective users through the contactless payment acceptance interfaces, intent messages followed by verification messages, wherein the at least one processor is configured to determine whether a received message is an intent message or a verification message through analysing content of the received message; and, upon receiving a message:
update, in the memory, intent message data or verification message data depending on the received message content, the intent message data containing at least a portion of a most recent intent message from each user and the verification message data containing at least a portion of a most recent verification message from each user;

determine from the intent message data or the verification message data if at least one rule has been satisfied;

provide a first indication when the at least one rule has been satisfied by the verification message data alone; and provide a second indication when the at least one rule has been satisfied otherwise, wherein the first indication differs from the second indication.

16. The hub of claim 15, wherein the three contactless payment acceptance interfaces are positioned around a circularly around the hub in different directions.

17. The hub of claim 15, wherein data relating to the at least one rule is received via user input.

18. The hub of claim 15, wherein data relating to the at least one rule is received via wireless communication.

19. The hub of claim 15, wherein the at least one rule is an expected total amount of a payment transaction.

20. The hub of claim 15, wherein the at least one processor is configured to transmit, to a payment network for each intent message, a payment authorisation request based on the intended contribution in the respective intent message.

* * * * *